(12) United States Patent
Orbeck et al.

(10) Patent No.: US 6,270,305 B1
(45) Date of Patent: Aug. 7, 2001

(54) HIGH TEMPERATURE CONVEYOR FURNACE WITH LOW FRICTION CONVEYOR TRAVEL SURFACE

(75) Inventors: Gary Orbeck, Windham, NH (US); Robert Hutcheson, Reading, MA (US)

(73) Assignee: BTU International, Inc., North Billerica, MA (US)

( * ) Notice: Subject to any disclaimer, the term of this patent is extended or adjusted under 35 U.S.C. 154(b) by 0 days.

(21) Appl. No.: 09/591,724

(22) Filed: Jun. 12, 2000

Related U.S. Application Data

(60) Provisional application No. 60/138,858, filed on Jun. 11, 1999.

(51) Int. Cl.[7] ............... B65G 15/60; F27D 5/00
(52) U.S. Cl. ............... 414/157; 198/841; 432/153; 432/239
(58) Field of Search ............... 414/157; 198/841; 432/153, 239

(56) References Cited

U.S. PATENT DOCUMENTS

| | | | |
|---|---|---|---|
| 3,582,054 | * | 6/1971 | Beck ............... 432/153 X |
| 3,955,668 | * | 5/1976 | Buschbora et al. ............... 198/841 X |
| 4,412,816 | * | 11/1983 | Schlumberger et al. ............... 414/157 X |
| 4,569,661 | * | 2/1986 | Kramer ............... 432/253 |
| 5,136,616 | * | 8/1992 | Heuss ............... 432/239 X |

FOREIGN PATENT DOCUMENTS

0479516 * 4/1992 (EP) ............... 198/841

* cited by examiner

Primary Examiner—Steven A. Bratlie
(74) Attorney, Agent, or Firm—Weingarten, Schurgin, Gagnebin & Hayes LLP

(57) ABSTRACT

A high-temperature conveyor furnace with a low friction conveyor travel surface is provided. The furnace includes a muffle defining a heating chamber, hearth plates providing a hearth surface within the heating chamber, and a conveyor belt to convey product through the heating chamber. The conveyor belt is formed of a first material, such as a nickel-chrome alloy. A plurality of low-friction inserts are supported by the hearth plates, preferably in openings in the hearth plates, to provide a surface upraised from the hearth surface upon which the conveyor belt travels. The inserts are formed of a second material, such as an electronics grade ceramic, that is different from the first material of the conveyor, which minimizes friction between the inserts and the belt. The low-friction surface is particularly suitable for high temperature, low dewpoint furnace applications, such as stainless steel brazing.

20 Claims, 3 Drawing Sheets

HIGH TEMPERATURE CONVEYOR FURNACE WITH LOW FRICTION CONVEYOR TRAVEL SURFACE

CROSS REFERENCE TO RELATED APPLICATIONS

Priority is claimed under 35 U.S.C. Section 119(e) to U.S. Provisional Application No. 60/138,858, filed Jun. 11, 1999, entitled "Button Hearth System," the disclosure of which is incorporated by reference herein.

STATEMENT REGARDING FEDERALLY SPONSORED RESEARCH OR DEVELOPMENT

N/A

BACKGROUND OF THE INVENTION

In a known type of furnace, product is conveyed through a heating chamber of a furnace on a conveyor belt. The belt travels over the surface of a hearth, which is typically formed by shallow metal pans called hearth plates. A furnace muffle surrounds the hearth plates and the belt to define the heating chamber. See FIG. 1, in which the belt is omitted and a portion of the muffle is shown cut away to better illustrate the hearth plates.

This type of conveyor furnace is used for a variety of applications, including stainless steel brazing. Stainless steel brazing requires a high temperature and a low dewpoint inside the furnace. In this application, copper wire is wrapped around a joint. The product with the joint is passed through the furnace, melting the copper and brazing the joint. The melting temperature of copper is approximately 1080° C., so the temperature within the muffle must be in excess of 1100° C. and is typically in the range of 1120 to 1130° C. The oxygen level must also be very low, typically measured by a dewpoint of −70° F. or less in a hydrogen atmosphere. Because oxygen in a hydrogen atmosphere reacts with the hydrogen to form water, the oxygen level in such a furnace is typically determined by measuring the dewpoint in the furnace.

In this type of furnace, there is continuous friction between the belt and the hearth. Hearth materials vary, but the overwhelming choice of hearth material is metal and for higher temperature applications is typically a nickel-chrome (Ni—Ch) alloy. This material is also used for the belt. This material is able to withstand the temperatures in the furnace while retaining sufficient strength to support the product without failure. The coefficient of friction between the belt and the hearth ranges from 0.3 to nearly 0.6 when the temperature is above 1100° C. A high coefficient of friction causes serious drag and wear life problems.

Also, in furnace atmospheres where oxygen is present, slight oxidation occurs on the belt and hearth plates, providing a protective coating against wear and grinding. In furnace atmospheres with very low dewpoints and at high temperatures, however, no or minimal oxidation occurs, and metal is often transferred from the belt onto the hearth. These metal deposits on the hearth create bumps and burrs that cause severe drag and wear problems against the traveling belt.

SUMMARY OF THE INVENTION

The present invention provides a high-temperature conveyor furnace with a low friction conveyor travel surface. The furnace includes a muffle defining a heating chamber, hearth plates providing a hearth surface within the heating chamber, and a conveyor belt to convey product through the heating chamber. The conveyor belt is formed of a first material, such as a nickel-chrome alloy. A plurality of low-friction inserts are supported by the hearth plates, preferably in openings in the hearth plates, to provide a surface upraised from the hearth surface upon which the conveyor belt travels. The inserts are formed of a second material, such as an electronics grade ceramic, that is different from the first material of the conveyor, thereby minimizing friction between the inserts and the conveyor belt. The low-friction surface provided by the inserts is particularly suitable for high temperature, low dewpoint furnace applications and $H_2$ atmosphere applications, such as stainless steel brazing.

In the presently preferred embodiment, the inserts include a base portion and an upraised portion having an overhang or shoulder that extends radially beyond the base portion. The base portion fits within an appropriately-sized opening formed in the hearth plate. The overhang or shoulder of the upraised portion rests on the upper surface of the hearth plate.

The size and spacing of the inserts are chosen to adequately support the conveyor belt and product while minimizing the amount of material in each insert. Minimizing the amount of material in the insert minimizes breakage, thermal shock due to temperature differentials across the insert, and cost. The underside of each insert preferably includes a recess formed therein, which additionally aids in minimizing the amount of material.

DESCRIPTION OF THE DRAWINGS

The invention will be more fully understood from the following detailed description taken in conjunction with the accompanying drawings in which.

DETAILED DESCRIPTION OF THE INVENTION

Figure 1:
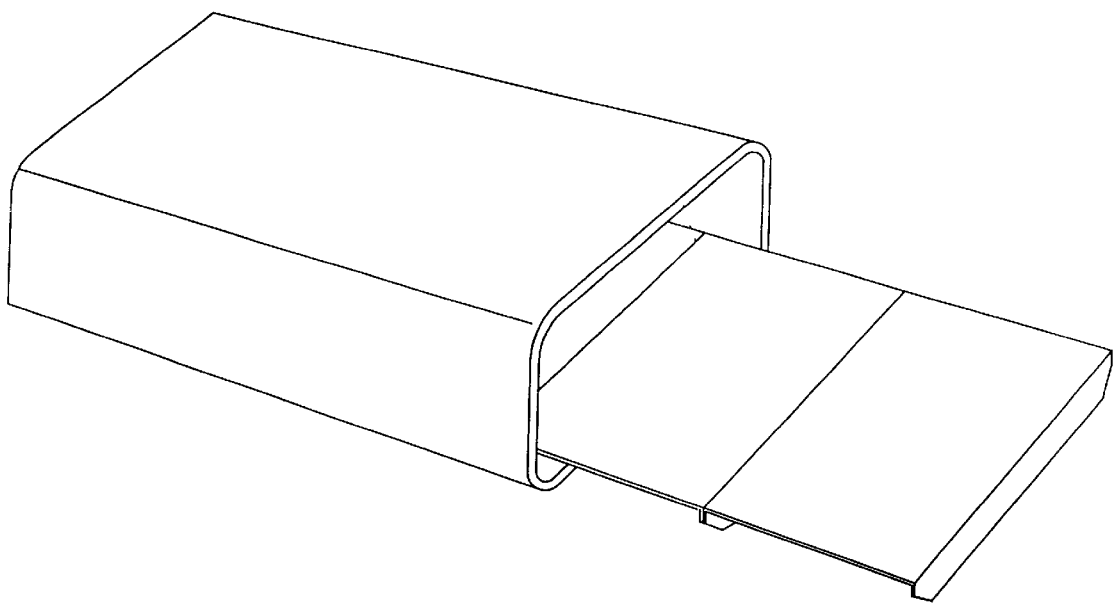
FIG. 1 is a schematic illustration of a prior art conveyor furnace, with the muffle partially cut away.
Figure 2:
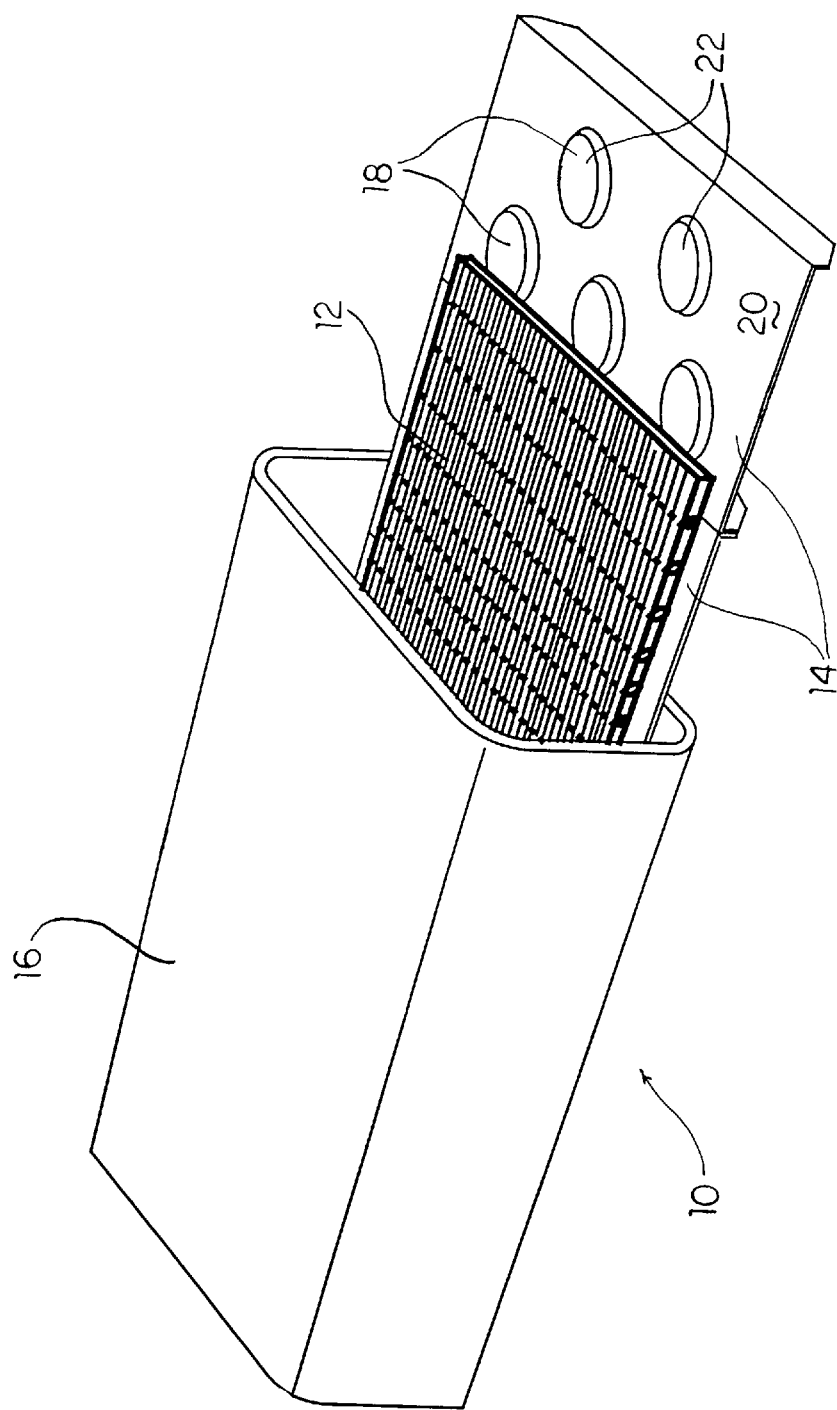
FIG. 2 is a schematic illustration of a conveyor furnace according to the present invention.

Referring to FIG. 2, the present invention relates to a conveyor furnace 10 having a metal conveyor belt 12 that travels over hearth plates 14 within a muffle 16. A plurality of inserts or buttons 18 is supported by the hearth plates to extend in an upraised configuration from the upper surface 20 of the hearth plates. The inserts are formed of a material that is different from the material of the conveyor belt. The upper surface 22 of the inserts forms a sliding friction surface between the belt and the hearth.

Figure 3:
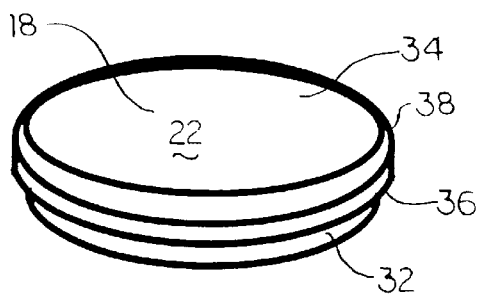
FIG. 3 is an isometric top view of an insert according to the present invention.
Figure 4:
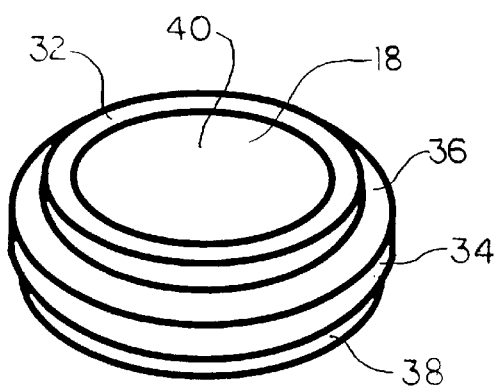
FIG. 4 is an isometric bottom view of the insert of FIG. 3.
Figure 5:
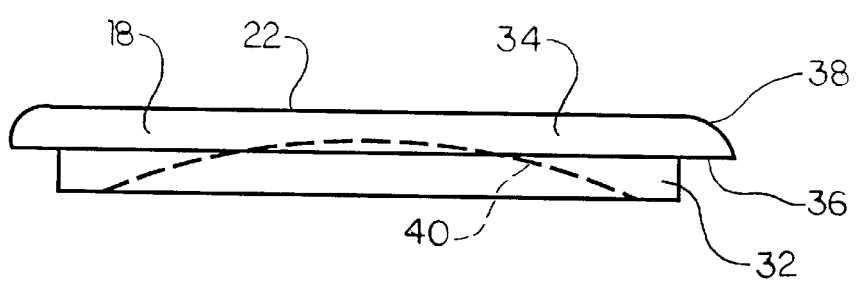
FIG. 5 is a side view of the insert of FIG. 3.

Referring to FIGS. 3 through 5, in the presently preferred embodiment, each insert 18 includes a base portion 32 and an upraised portion 34. The base portion of the insert has a cross-sectional dimension narrower than the cross-sectional dimension of the upraised portion. The base portion fits within an appropriately-sized opening formed in the hearth plate. The upraised portion includes a shoulder or overhang 36 that extends beyond the periphery of the base portion. When the insert is placed in the opening, the shoulder 36 rests on the upper surface 20 of the hearth plate 14. In this way, the insert is supported by and retained on the hearth plate. The inserts may be bolted or otherwise fastened to the hearth plates if desired. The upraised portions 34 extend above the hearth surface 20 so that the upper surfaces 22 of the inserts form a surface upon which the belt travels. The outer periphery 38 of the upraised portion is rounded or radiused to prevent catching the belt. The inserts are preferably round or circular in cross-section for ease of manufacture and to eliminate corners upon which the belt may catch. Other shapes, however, such as oval or rectangular, preferably with rounded corners, may be provided if desired.

The insert 18 is made from a material that is dissimilar to the material of the belt 12, which is typically a nickel-chrome alloy. This dissimilarity yields the lowest level of friction between the sliding belt and the supporting surfaces 22 of the inserts. Preferably, the inserts are made from an electronics grade ceramic, such as an electronics grade alumina. This material is an ultra high density material having a specific gravity of, for example, 3.1 or more. An ultra-high density material is very smooth, which minimizes grinding of the belt material. Other high-temperature-resistant materials may be used, such as molybdenum, tungsten, steatite, mullite or suitable grades of carbon. The insert may be formed in any suitable manner, such as by molding, casting, or machining.

The size and spacing of the inserts 18 are chosen to accommodate a number of functionalities. The conveyor belt 12 loaded with product must be adequately supported and must make contact with the upper surface 22 of the inserts and not with the surface 20 of the hearth plates. This functionality requires a sufficient amount of surface area from the inserts. The amount of material in each insert is, however, preferably minimized to minimize breakage, particularly of a ceramic material, to minimize known thermal shock limitations of the material due to temperature differentials across the material, and to minimize cost. Preferably, the underside of each insert includes a recess 40 formed therein, which also aids in minimizing the amount of material. In a preferred embodiment, each insert is circular in cross-section and has an upper surface diameter ranging from 1 to 3 inches. The thickness ranges from 0.25 to 0.75 inch. The spacing between center points of each insert ranges from 4 to 12 inches. To maximize the density of the insert surface area over the hearth, the inserts in a row of inserts are preferably offset from the inserts in an adjacent row. That is, the inserts are in a hexagonal close packed formation.

The openings in the hearth plates may be formed in any suitable manner, for example, by punching the hearth plates. The openings may be formed in new hearth plates, or openings may be added to existing hearth plates that are then retrofitted with inserts according to the invention.

The use of inserts or buttons according to the present invention reduces the coefficient of friction between the belt 12 and the insert surfaces 22 to no more than 0.4 at a temperature of 1130° F. Also, the transfer of the belt material to the hearth in low dewpoint atmospheres is substantially reduced or eliminated. Additionally, because the belt does not have to endure the same level of drag forces as in prior art furnaces, the belt may be made with less material, which reduces both cost to manufacture and the amount of thermal heating power required during operation of the furnace.

It will be appreciated that other embodiments are contemplated by the present invention. For example, the inserts may rest on top of the hearth plates and be fastened thereto in an appropriate manner, as with bolts. Similarly, although the invention was described as particularly suitable for with stainless steel brazing, the invention is applicable to other applications that employ a conveyor furnace. The invention is not to be limited by what has been particularly shown and described, except as indicated by the appended claims.

What is claimed is:

1. A conveyor furnace comprising:

a heating chamber;

a hearth surface in the heating chamber;

a conveyor disposed to convey product over the hearth surface, the conveyor formed of a first material; and low-friction inserts supported by the hearth surface and having a surface upraised from the hearth surface, the inserts located to support the conveyor belt out of contact with the hearth surface, the inserts formed of a second material different from the first material of the conveyor.

2. The conveyor furnace of claim 1, wherein each of the inserts comprises a base portion and an upraised portion, the base portion sized to fit within an associated opening in the hearth surface.

3. The conveyor furnace of claim 2, wherein the upraised portion includes a shoulder extending beyond the base portion, the shoulder resting on the hearth surface.

4. The conveyor furnace of claim 1, wherein the insert is circular in cross section.

5. The conveyor furnace of claim 1, wherein the upraised surface of each insert includes a rounded edge.

6. The conveyor furnace of claim 1, wherein each insert further comprises a recess formed in an underside of the insert.

7. The conveyor furnace of claim 1, wherein the second material comprises an electronics grade ceramic.

8. The conveyor furnace of claim 1, wherein the second material has a specific gravity of at least 3.1.

9. The conveyor furnace of claim 1, wherein the second material comprises an electronics grade alumina.

10. The conveyor furnace of claim 1, wherein the second material comprises alumina, molybdenum, tungsten, steatite, mullite, or carbon.

11. The conveyor furnace of claim 1, wherein the second material is capable of withstanding a temperature of at least 1130° F.

12. The conveyor furnace of claim 1, wherein the inserts are located in rows, the inserts of one row offset from the inserts of an adjacent row.

13. The conveyor furnace of claim 1, wherein a coefficient of friction between the inserts and the conveyor is no greater than 0.4 at a temperature of 1130° F.

14. The conveyor furnace of claim 1, wherein the first material of the conveyor comprises a nickel-chrome alloy.

15. The conveyor furnace of claim 1, wherein the furnace is operable at a temperature of at least 1130° F.

16. A low-friction, high-temperature insert for a conveyor furnace, the insert comprising:

a base portion and an upraised portion, the base portion having a smaller cross-sectional dimension than the upraised portion, the upraised portion having a shoulder extending beyond a periphery of the base portion, the upraised portion providing a low-friction surface; and the insert formed of an electronics grade ceramic having a specific gravity of at least 3.1.

17. The insert of claim 16, wherein the electronics grade ceramic comprises alumina.

18. The insert of claim 16, wherein the base portion and the upraised portion are circular in cross-section.

19. The insert of claim 16, further comprising a recess formed in a lower surface of the base portion.

20. The insert of claim 16, wherein the upraised portion includes a rounded edge along the low-friction surface.

* * * * *